United States Patent [19]

Gwinn

[11] 4,385,016

[45] May 24, 1983

[54] METHOD OF EXTRUDING AND PELLETIZING EXPANDABLE POLYMERIC COMPOSITION WITH RECYCLING OF TRANSPARENT WATER SUPPLIED ACROSS THE FACE OF THE EXTRUSION DIE

[75] Inventor: J. S. Gwinn, Bartlesville, Okla.

[73] Assignee: Phillips Petroleum Company, Bartlesville, Okla.

[21] Appl. No.: 218,229

[22] Filed: Dec. 19, 1980

[51] Int. Cl.³ .................. B29D 27/00; B29B 1/03
[52] U.S. Cl. ........................... 264/37; 264/40.7; 264/54; 264/142; 264/DIG. 5; 425/144; 425/308
[58] Field of Search ............... 264/53, 54, 142, 40.7, 264/DIG. 5, 37; 425/144, 308

[56] References Cited

U.S. PATENT DOCUMENTS

| | | | |
|---|---|---|---|
| 2,576,977 | 12/1951 | Stober | 264/53 X |
| 2,862,243 | 12/1958 | Farr et al. | 264/142 X |
| 2,987,768 | 6/1961 | Given . | |
| 3,003,193 | 10/1961 | Chisholm | 264/53 X |
| 3,103,700 | 9/1963 | Halverson et al. | 264/142 X |
| 3,207,818 | 9/1965 | Marshall | 264/142 X |
| 3,230,582 | 1/1966 | Hoffman et al. . | |
| 3,316,590 | 5/1967 | Rettig . | |
| 3,372,215 | 3/1968 | Muirhead et al. | 264/142 X |
| 3,393,260 | 7/1968 | Miler | 264/54 |
| 3,415,917 | 12/1968 | Watanabe et al. | 264/142 |
| 3,436,449 | 4/1969 | Treu et al. | 264/142 |
| 3,551,943 | 1/1971 | Staton et al. . | |
| 3,819,543 | 6/1974 | Stastny et al. | 264/54 X |
| 3,892,834 | 7/1975 | Pritchard | 264/142 |
| 3,920,229 | 11/1975 | Piggott | 259/192 |
| 3,961,000 | 6/1976 | Ropiequet | 264/142 X |
| 3,972,665 | 8/1976 | Andrews | 425/205 |
| 3,988,085 | 10/1976 | Krchma | 425/71 |
| 4,117,645 | 10/1978 | Phillips | 264/142 X |
| 4,120,630 | 8/1979 | LaSpisa et al. | 425/142 |
| 4,180,539 | 12/1979 | Clarke | 264/143 |
| 4,263,409 | 4/1981 | Liberti | 264/54 X |

FOREIGN PATENT DOCUMENTS 849935  9/1960  United Kingdom .............. 264/142

Primary Examiner—Philip E. Anderson

[57] ABSTRACT

A method for providing pellets of extrusion compounded expandable polymeric compositions by (a) introducing a blowing agent and polymeric compound into an extruder, (b) extruding a composition containing the blowing agent and polymeric compound with discharge of the extrusion underwater through a pelleter at a temperature below blowing agent activation temperature, (c) supplying a stream of water across the die face of the pelleter at a predetermined first temperature sufficient to produce pellets, (d) supplying additional transport water downstream of the pelleter to further cool the pellets to a second predetermined temperature, and (e) separating the cooled pellets from the transport water. In an additional embodiment collecting the separated pellets, conditioning the transport water to the first predetermined temperature, and recycling the transport water to the die face.

In a process for extruding and transporting pellets in which an extruder discharges underwater through a pelleting device a method for controlling the temperature of the pellets in which transport water is supplied to the die plate of the pelleter at the first predetermined temperature sufficient to produce pellets and additional transport water supplied downstream of the pelleter further to cool the pellets to a predetermined second temperature.

In a method for transporting pelleted material a control system that comprises sensing and operating conditions, generating a signal according to the operating condition, and diverting flow of the pelleted material in response to that signal.

11 Claims, 1 Drawing Figure

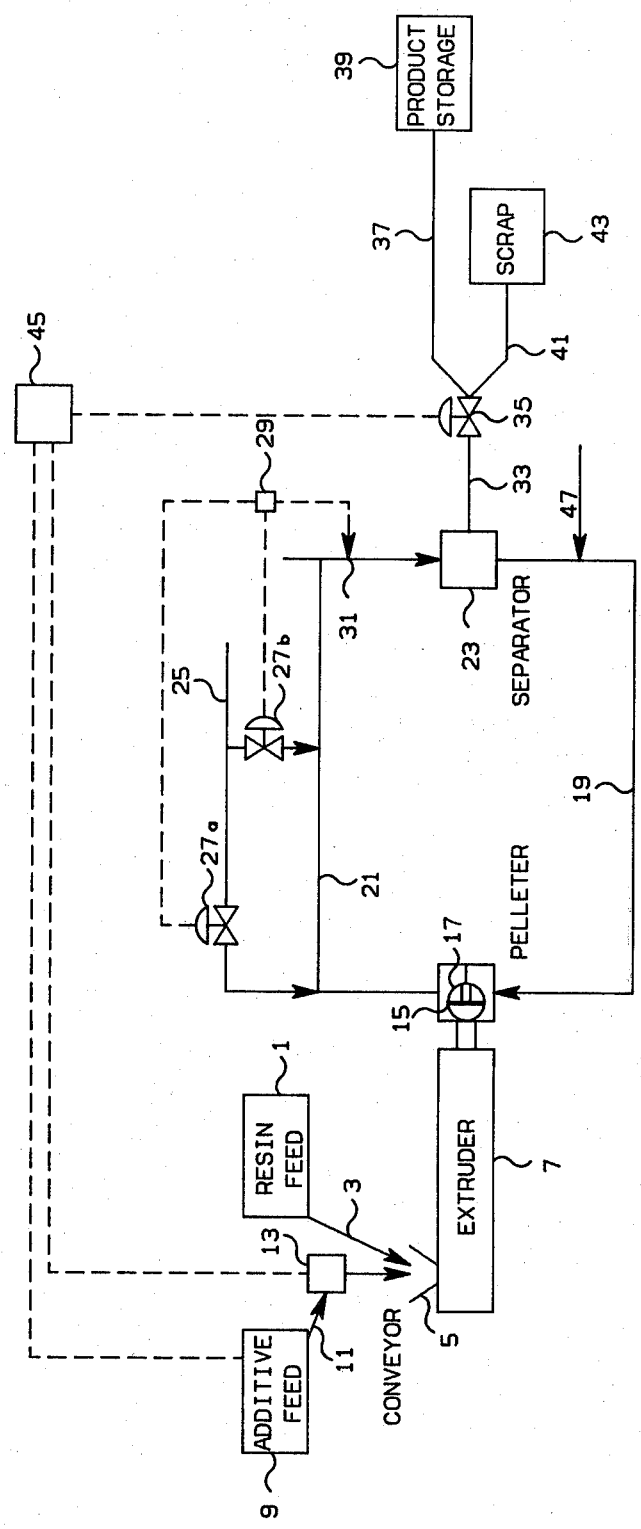

METHOD OF EXTRUDING AND PELLETIZING EXPANDABLE POLYMERIC COMPOSITION WITH RECYCLING OF TRANSPARENT WATER SUPPLIED ACROSS THE FACE OF THE EXTRUSION DIE

BACKGROUND OF THE INVENTION

This invention relates to the production and transport of pelleted material. In one of its aspects it relates to underwater pelleting systems and the transporting of pellets formed underwater. In another of its aspects, it relates to a method for cooling pellets discharged from an underwater pelleter. In another of its aspects it relates to the compounding of blowing agent into polymeric material with extrusion and cooling of the pelleted compositions. In another of its aspects it relates to the diversion of flow in the transporting of pelleted material.

Many processes relating to the compounding of polymeric resinous material with various additives, the extrusion and underwater pelleting of these cmpositions and the transportation of the pellets produced are well known in the art. Upon actually assembling a system for compounding a blowing agent with a polymeric resin to produce a pelleted product without activating the blowing agent in the pellets it was discovered that such an integrated process required manipulations which are surprising in light of the known prior art. Some of these manipulations are applicable to general systems for the pelleting and transport of pelleted materials.

It is therefore an object of this invention to provide an integrated process for compounding additives, particularly blowing agents, with polymeric resins, extruding and pelleting the compositions, and providing cooled, pelleted product, that particularly in the case of pellets containing blowing agent are not activated to expand during the process. It is also an object of this invention to provide a general process for extruding and transporting pellets. It is another object of this invention to provide a method for cooling pellets which are extruded underwater. It is still another object of this invention to provide a control system in the transporting of pelleted material in which flow can be diverted automatically from a product collection vessel to an off-grade pellet collection vessel.

Other aspects, objects and various advantages of this invention will become apparent upon reading this disclosure and the appended claims in conjunction with the drawing.

STATEMENT OF THE INVENTION

According to this invention a method is provided for producing pellets of an extrusion compounded expandable polymeric composition in which (a) blowing agent and polymeric compound are introduced into an extruder, (b) the composition of blowing agent and polymeric compound are extruded through a pelleter with discharge underwater at a temperature below the blowing agent activation temperature, (c) a stream of water supplied across the die face of the pelleter at a predetermined first temperature for cooling and transporting the pellets, (d) additional transport water is supplied downstream of the pelleter in an amount and a temperature further to cool the pellets to a second predetermined temperature, and (e) pellets cooled sufficiently below the activation temperature of the blowing agent to prevent expansion during storage are separated from the transport water.

In a further embodiment the pellets separated from the transport water are (f) collected for storage or further transport and (g) the transport water is subjected to conditioning through the first predetermined temperature and (h) the conditioned transport water is recycled to the face of the pelleter die.

In an embodiment of the invention a generally applicable process for extruding and transporting pellets in which there is an extrusion through a pelleting device with discharge underwater, a method is provided for controlling, preferably reducing, the temperature of pellets in which (a) transport water is supplied to the die face of the pelleter at a predetermined first temperature sufficient to produce pellets, and (b) additional transport water supplied downstream of the pelleter at a flow and a temperature sufficient further to cool the pellets to a predetermined second temperature.

In yet another embodiment of the invention generally applicable to a method for transporting pelleted material a control system is provided in which an operating condition in the process is sensed, a signal is generated according to the operating condition, and flow of the pelleted material is diverted in response to the generated signal. The diversion of the flow to which this is particularly applicable is the prevention of contaminating product material with pellets that would be considered off-grade because of an operating condition variance in the process.

Although this invention is applicable to the compounding, extrusion, pelleting, and transportation of pellets produced from any polymeric material, it is of particular use with resinous thermoplastic polymer and most particularly of interest with polymers and copolymers of olefins, i.e., ethylene, propylene, butylene, and the like.

In some aspects of the invention the polymeric material is used alone, but when used in combination with the blowing agent it is important that the temperature of the extruder and of the extrudate be kept below that temperature at which blowing agent is activated to produce an expanded resinous composition. It has been found, for instance, although the temperature in the extruder and the pelleter have been maintained in practice below that temperature at which there is substantial activation of the blowing agent that upon a transfer from the pelleter into a storage vessel enough heat has been retained in the pellets to cause some activation of the blowing agent with expansion of the resin. In normal use, up to about 10 to about 15 percent expanded pellets in a batch is tolerated. Correction of this problem is not a simple matter of lowering the temperature of the water crossing the pelleter die face to provide further cooling of the pellets as they contact the transport water on being carried downstream from the pelleter. The temperature of the cooling water at the pelleter die face cannot be cold enough to cause an over-cooling of the extrudate as it passes through the die plate at the pelleter or the operation of the pelleter is affected. A system has, therefore, been developed in which the cooling water passing the pelleter face is maintained at a temperature in the range of about 150° to about 180° F. Actually, the temperature of the cooling water at the pelleter die is easily optimized by trial and error for any given resin system where the water temperature is (called the first predetermined temperature) maintained slightly warmer than the temperature at which problems develop in passing extrudate through the die in forming uniform pellets.

To compensate for the relative warmth of the water circulating past the die plate it has been found that the addition of cool water downstream of the pelleter in an amount and of the temperature to provide a desired final temperature of the pellets herein called the second predetermined temperature, in a range of about 120° F. to about 180° F., is easily accomplished by adding water at ambient temperature at positions in the transfer line downstream of the pelleter. Control of the water temperature can be done manually by adjusting the amount of added water flow to be sufficient to produce a certain measured temperature near the point in the system where the water is separated from the pellets to be recycled through the pelleter system. Automatic control can be used to reset one or more motor valves introducing additional water at ambient temperature into the transport cycle in accordance with maintaining a preset temperature at a downstream point in the transport line.

As stated above, control of the water cycle temperature is most important when a temperature-sensitive additive such as a blowing agent has been compounded with the resin and pelleted. For the purposes of this invention any of the known blowing agents, i.e., compounds which thermally decompose in plastics in the temperature range of about 250° to about 550° F., can be used, usually in quantities ranging from about 0.05 to about 1.0 php in compounding with the resins to produce expanded compositions upon activation of the blowing agent. Examples of such compounds include 2,2'-azobis(2-methylpropionitrile), N,N'-dinitrosopentamethyltetraamine, p,p'-oxybis(benzenesulfonyl hydrazide), urea, azodicarbonamide and the like. In the presently preferred embodiment of this invention azodicarbonamide having a decomposition temperature in the range of about 365° F. to about 385° F. is used.

The invention can best be understood referring to the drawing which is a schematic representation of the process of this invention.

In the FIGURE particulate resin, in this case high-density polyethylene was loaded into a resin feeder 1 which was a conveyer feeder, but can be any other known type which passes a resin at a measured rate through a delivery line 3 into the feedport 5 of an extruder 7. Similarly, an additive feeder 9, loaded with a concentrate containing proportioned amounts of resin powder (fluff), blowing agent, in this case azodicarbonamide, and antioxidant were transferred at a metered rate through line 11 to an auger conveyer 13 which discharged beneath the surface of the particulate polyethylene in the feed hopper. This was used because of the dusty nature of the combination of antioxidant and blowing agent to prevent contamination of the exterior of the system with the antioxidant/blowing agent concentrate and to provide an accurate means of metering the concentrate into the extruder inlet port 5. Both the resin feed and the concentrate were accurately measured into the extruder feed to assure the proper concentration of the blowing agent and antioxidant compounded with the resin.

The extruder was operated to provide a melt temperature less than 375° F. to prevent activation of the blowing agent in the extruder. The high-density polyethylene resin which had a melt index in the range of about 1.25 to about 1.75 and required a melt temperature in the range of at least about 370° F. for extrusion. The extruder that was used in processing this resin was based on the screw design set out in U.S. Pat. No. 3,486,193.

The molten resin was extruded through a die plate having holes of about 0.140" diameter. A high speed underwater knife cutter 17 was operated adjacent to die plate 15 to cut the extruded resin into large diameter, thin pellets. In this operation pellets having a diameter in the range of about 160-165 mils and a thickness of about 60-70 mils were produced thereby providing a pellet sized to minimize heat retention which could result in activation of the blowing agent. The transport water passed through line 19 was maintained at a temperature of about 170° F. and was passed across the die plate 15 to carry the pellets through line 21 to a separating mechanism 23. Water at ambient temperature was supplied from an outside source through line 25 and valves 27a, 27b into pellet transfer line 21 downstream of the pelleter. The addition of ambient temperature water was controlled manually, but could easily be adapted to control in response to a signal generated by a controller 29 to maintain a specified temperature by control point 31. The water added downstream of the pelleter was controlled by hand valve in response to a temperature registered at a point downstream such as 31. In the presently preferred operation sufficient ambient water was supplied to maintain the temperature at 31 at about 170° F.

It can be seen, therefore, that in this operation water was supplied through line 19 to provide cooling fluid at a first predetermined temperature of about 170° at the pelleter die face 15. Upon contacting the hot die face and hot pellets which have left the extruder at about 370° F. the transport water was heated sufficiently that the addition of ambient water through control valves 27a, 27b was necessary to maintain the temperature of the compounded resin pellets at a temperature sufficiently reduced to prevent excessive activation of the blowing agent.

The water-pellet slurry was passed to apparatus 23 for separating and drying the pellets (here a separator with centrifugal drying and additional drying with warm air circulated through the pellets). In actual operation the separated water was at a temperature below the 170° F. desired for recirculation and was treated with steam through line 47 to attain that temperature.

The pellets which pass through line 33 can be directed through diverter valve 35 through line 37 and the product storage tank 39 or can be diverted into line 41 and scrap storage tank 43. The setting of diverter valve 35 responds to an upstream operating condition such as the sensed operation of auger conveyer 13 or the sensed operation of the moving parts of additive feeder 9 or the sensed movement of the additive itself through the lines for which a signal was generated by controller 45 which then passed the signal to diverter valve 35 to position it for passage of pellets to product storage if operation was within designed parameters or flow was diverted to the scrap tank upon sensing of operation outside of designed parameters.

I claim:

1. A method for providing pellets of extrusion compounded expandable polymeric compositions comprising:
   (a) introducing a blowing agent and said polymeric compound into an extruder in a ratio of flowing agent to polymeric compounds sufficient to provide expansion of a composition of the polymeric compound and blowing agent upon elevation of temperature to the activation temperature of the blowing agent, (b) extruding a composition of said polymeric compound and blowing agent discharging underwater through a pelleter at a temperature below the flowing agent activation temperature, (c) supplying a stream of water across the die face of said pelleter for cooling and transporting pellets, said water being supplied at a predetermined first temperature in a range to maintain pellets below blowing agent activation temperature but sufficiently elevated to cause formation of uniform pellets, (d) supplying additional transport water downstream of said pelleter in an amount and of a temperature further to cool the pellets and total flow of transport water to a second predetermined temperature in a range substantially to prevent activation of blowing agent by heat retained in said pellets, and (e) separating the cooled pellets from said transport water.

2. A method of claim 1 further comprising:

(f) collecting said separated pellets, (g) conditioning said transport water of step (d) to said predetermined first temperature, and (h) recycling said transport water to the die face.

3. A method of claim 1 wherein said blowing agent is combined with at least one other additive chosen from powdered polymeric compounds and antioxidants for introduction into said extruder thereby providing an additive composition.

4. A method of claim 1, 2 or 3 wherein said separated pellets are transported through a flow diverter valve into product storage in response to a signal generated according to operation upstream in the process being sensed within designed parameters.

5. A method of claim 1, 2 or 3 wherein said separated pellets are transported through a flow diverter valve into a scrap storage vessel in response to a signal generated according to operation upstream in the process being sensed that is outside of designed parameters.

6. A method of claim 4 wherein the operating condition is the sensed transporting of an additive to the extruder.

7. A method of claim 5 wherein the operating condition is the sensed transporting of an additive to the extruder.

8. A method of claim 1, 2, or 3 wherein said thermoplastic resin is high-density polyethylene, said blowing agent is azodicarbonamide activated at a temperature in the range of about 365°–385° F., said predetermined first temperature is in the range of about 150°–180° F., and said predetermined second temperature is in the range of about 120° to about 180° F.

9. A method of claim 8 wherein the azodicarbonamide blowing agent is activated at a temperature of about 375° F., said first predetermined temperature is about 170° F., and said second predetermined temperature is about 170° F.

10. In a process for extruding and transporting pellets in which an extruder is discharged underwater through a pelleting device a method for controlling the temperature of the pellets comprising (a) supplying transport water to the die plate of said pelleter at a predetermined first temperature in a range sufficiently elevated to form uniform pellets but below a specifically designated temperature, and (b) supplying additional transport water downstream of said pelleter at a flow and temperature further to cool said pellets to a predetermined second temperature in a specifically designated range.

11. In a method for transporting pelleted material a control system comprising:

(a) sensing the operation of a device transporting an additive to the inlet of the extruder process, (b) generating a signal according to said sensed operation, and (c) diverting flow of said pelleted material in response to said signal.

* * * * *

UNITED STATES PATENT AND TRADEMARK OFFICE
CERTIFICATE OF CORRECTION

PATENT NO. : 4,385,016

DATED : September 19, 1980

INVENTOR(S) : J. S. Gwinn

It is certified that error appears in the above-identified patent and that said Letters Patent is hereby corrected as shown below:

Claim 2, lines 3 and 4 should read g) reestablishing said transport water of step (e) within said first temperature range, and ---.

Signed and Sealed this

Sixth Day of December 1983

[SEAL]

Attest:

Attesting Officer

GERALD J. MOSSINGHOFF

*Commissioner of Patents and Trademarks*